Figure 2:
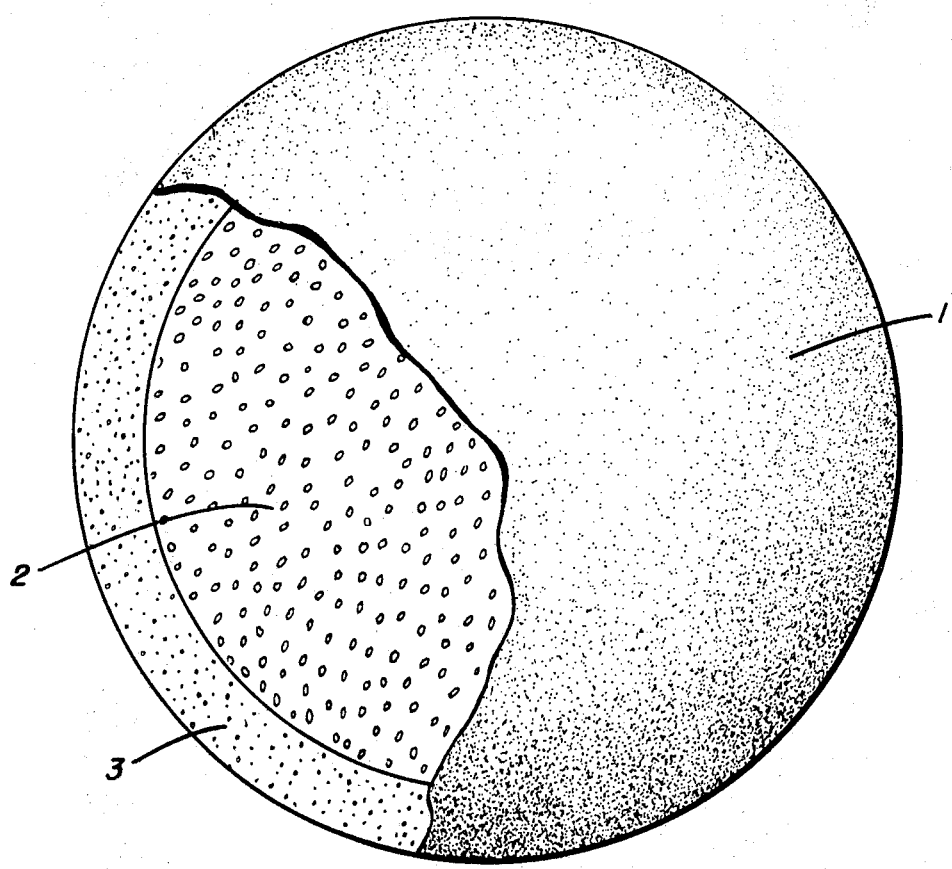

United States Patent

[11] 3,615,593

| [72] | Inventor | Arvind Shankar Patil |
| | | Silver Spring, Md. |
| [21] | Appl. No. | 843,102 |
| [22] | Filed | July 18, 1969 |
| [45] | Patented | Oct. 26, 1971 |
| [73] | Assignee | W. R. Grace & Co. |

[54] METHOD FOR PREPARING AERATED CONFECTIONARY
4 Claims, 2 Drawing Figs.

| [52] | U.S. Cl. | 99/134, 99/138 |
| [51] | Int. Cl. | A23g 3/00 |
| [50] | Field of Search | 99/134, 138 |

[56] References Cited
UNITED STATES PATENTS

| 1,391,918 | 9/1921 | Thompson | 99/134 |
| 1,851,988 | 4/1932 | Scott | 99/134 |
| 2,726,959 | 12/1955 | Lushbough et al. | 99/134 |
| 3,020,164 | 2/1962 | Forkner | 99/134 |

Primary Examiner—Raymond N. Jones
Assistant Examiner—J. M. Hunter
Attorneys—Eugene M. Bond and Kenneth E. Prince ABSTRACT: An aerated confectionary product prepared by heating hard malted-milk taffy confectionary balls to a softening point without substantial deformation after which the softened malted-milk taffy confectionary balls are cooled to case harden the surfaces. Thereafter, the malted-milk taffy confectionary balls having hardened surfaces and softened centers are vacuum expanded.

3,615,593

```
┌─────────────────────────────────┐
│ HEATING HARD MALTED - MILK      │
│ TAFFY BALLS TO SOFTENING        │
│ POINT WITHOUT SUBSTANTIAL       │
│ DEFORMATION.                    │
└─────────────────────────────────┘
                 │
                 │
┌─────────────────────────────────┐
│ COOLING SOFTENED MALTED - MILK  │
│ TAFFY BALLS TO HARDEN           │
│ SURFACE.                        │
└─────────────────────────────────┘
                 │
                 │
┌─────────────────────────────────┐
│ VACUUM EXPANDING MALTED - MILK  │
│ TAFFY BALLS WITH HARDENED       │
│ SURFACE AND SOFTENED CENTER.    │
└─────────────────────────────────┘
```

*FIG. 1*

INVENTOR

ARVIND S. PATIL

BY *Eugene M. Bond*

ATTORNEY

ARVIND S. PATIL
INVENTOR

METHOD FOR PREPARING AERATED CONFECTIONARY

This invention relates to an aerated confectionary product and a method of preparing same by vacuum expanding malted-milk taffy balls having case hardened surfaces and softened centers. More particularly, the present invention provides a method of preparing malted-milk taffy confectionary balls by heating hard malted-milk taffy balls to uniformly soften same without substantial deformation, after which the taffy balls are surface cooled to case harden the surfaces. Thereafter, the malted-milk taffy balls having hardened surfaces and softened centers are vacuum expanded to a desired size. The malted-milk confectionary balls so prepared are found to have an aerated case hardened surface characterized with relatively small substantially uniform minute cellular structure disposed about a center portion characterized with a relatively larger, although minute, substantially uniform cellular structure.

Malted-milk confectionary balls may be prepared by numerous methods including that disclosed by Scott in U.S. Pat. No. 1,851,988. Initially, a malted-milk syrup is prepared from which water is evaporated with agitation until a taffy consistency is obtained with a small percentage of air and moisture distributed evenly therethrough in minute cells of substantially uniform size. The uniformly aerated malted-milk taffy may then be formed into small hardened pieces, which pieces are expanded by a vacuum process to form small compact malted-milk balls of substantially uniform minutely cellular structure throughout.

It has now been found by the practice of the present invention that an aerated confectionary may be prepared by a method having application to batch or continuous processing techniques while providing a product having good bite characteristics, more uniform size, and a more highly case hardened surface providing greater compression strength than aerated confectionary products prepared heretofore. Malted-milk balls prepared by the present invention appear to involve a redistribution of material with a greater material density in the case hardened surface relative to the material density of the encased central portion.

Generally stated, the present invention provides an aerated confectionary product prepared by a method which includes the steps of heating hard malted-milk taffy confectionary balls to a softening point without substantial deformation, cooling the softened malted-milk taffy confectionary balls to case harden the surfaces, and thereafter vacuum expanding the malted-milk taffy confectionary balls having hardened surfaces and softened centers.

Referring to the figures;

FIG. 1 diagrammatically illustrates the method of the present invention; and

FIG. 2 illustrates in enlarged form a product prepared by a method of the present invention.

In the figures, Fig. 1 illustrates three essential steps of the present invention requiring first heating hard malted-milk confectionary taffy balls to a softening point without substantial deformation after which the taffy balls are cooled to case harden the surfaces thereof followed by vacuum expansion of the malted-milk taffy confectionary balls having hardened surfaces and softened centers.

Fig. 2 illustrates aerated confectionary product 1 appearing as a malted-milk ball having a center portion 2 characterized with a relatively large substantially uniform cellular structure over which is disposed case-hardened layer 3 characterized with a relatively small substantially uniform minute cellular structure.

The aerated confectionary product of the present invention may be prepared from a confectionary dough which may include, as desired, a number of essential components known to the art. One example of a confectionary dough for use herein may be prepared by boiling sugar syrup at 120° C. to reduce the moisture content to a range of about 6 percent to about 8 percent by weight. At this stage, malted milk and sugar powder may be added to the syrup which is continuously agitated to a uniform viscous consistency. The viscous syrup may be processed as desired such as in a vacuum kneader to further reduce the moisture content, if desired. After the confectionary dough has been prepared in the conventional manner, it may be brought to a point of elasticity such that the dough may be rolled into a ribbon of convenient thickness. The dough is desirably in the form of a plastic mass having a smooth, creamy, noncrystalline plastic consistency. If required, the dough may be powdered with sugar, starch, flour or the like to prevent sticking in the processing machinery. The confectionary dough may next be passed through a series of kneading rollers from which the confectionary dough is passed through ball-forming rollers. The ball-forming rollers may consist of kneading rollers provided with concave molds disposed on the surfaces thereof. A confectionary sheet is received from the ball-forming unit and appears as a number of spherical units joined by a thin webbing of confectionary material.

The sheets of confectionary dough having ball formations joined by thin webbing of confectionary material may be aged for a period of time up to about 24 hours in a controlled environment of temperature and humidity. After a suitable aging period, the formed confectionary sheets may be tumbled in a coating pan or related system to disjoin the individual confectionary balls and remove the thin webbing material.

The prepared malted-milk balls are now ready to be processed by the method of the present invention. Hard malted-milk taffy confectionary balls desirably having a moisture content in range of about 4 percent to about 6 percent by weight, are heated to a softening point without substantial deformation. It is found that the heating without substantial deformation may be effected at a temperature in the range of about 70° C. to about 120° C., depending upon the taffy material being processed. After the hard malted-milk taffy balls have attained a substantially uniform temperature throughout without substantial deformation, the malted-milk taffy balls are next cooled to case harden the surfaces thereof. The surfaces may be hardened by exposing the heated malted-milk taffy balls to a temperature of about 40° C. to about 70° C. and, desirably a temperature of about 60° C., for a period of time sufficient to case harden at least about 1 percent to about 10 percent of the radial distance of the balls. After a period of time sufficient to case harden the indicated radial distance, the malted-milk taffy balls having the case hardened surface and softened center are expanded under vacuum. The degree of vacuum employed to expand the malted-milk taffy balls may be varied although it is found that at least 15 to about 30 mm. of mercury (Hg) vacuum is desirable and generally sufficient. The temperature of the vacuum chamber is maintained such that the case hardened surface is neither softened nor further substantially case hardened during the vacuum expanding process period. After the malted-milk taffy balls have been expanded, they may be coated as desired with chocolate or other known coatings according to conventional practice.

The present aerated confectionary product is found to have good bite characteristics, more uniform size, and a more highly case hardened surface providing greater compression strength than aerated confectionary products prepared heretofore.

The present invention will be further illustrated by the following examples:

EXAMPLE 1

Following the practice of a prior art method, a confectionary dough is prepared from sugar syrup, malted-milk and sugar powder. The homogeneous mixture of taffy dough is processed to a moisture content of about 6 percent by weight. The dough is passed through a series of rollers to a ball forming station after which a sheet of dough having ball formations joined by a thin webbing is received and taken to an aging station where the sheets are aged for a period of 2 hours. Aging is effected at a relative humidity of about 20 percent and at room temperature. After the balls are disjointed from the webbing material in a rotary pan, they are placed on trays and taken to a vacuum drier having a controlled inside temperature maintained at about 95° C. The vacuum inside the drier is maintained at about 29 mm. of mercury and is continuously monitored. After about 1 hour in the vacuum drier, expanded balls are removed and screened for size while cooling to room temperature. Thereafter, the prepared malted-milk balls are tested as indicated subsequently.

EXAMPLE 2

The procedure of Example 1 is repeated except that after the aging period, the malted-milk balls are heated at a temperature of about 95° C. to soften the malted-milk balls to their softening point and to a substantially uniform plastic consistency. Thereafter, the malted-milk balls are surface cooled at a temperature of about 70° C. to case harden the surface to a depth of about 5 percent of the radial distance. The case hardened taffy balls having hardened surfaces and softened centers are next vacuum expanded according to the procedure of example 1.

Compression strength measurements were performed on samples of the product prepared by the procedures of examples 1 and 2 respectively. The force required to break the external skeleton and the force required to break the external skeleton and the force required for total rupture of the samples was determined. Compression strength measurements provide an indication of the strength of the case hardened surface skin, whereas the total force required for rupture provides an indication of bite characteristics. 80 percent of the malted-milk balls prepared by the procedure of example 2 were found to have a compression strength, defined as a breaking under pressure of the external skeleton, of an average of 2 lbs. as compared to 80 percent of the malted-milk balls produced by the procedure of example 1 having a compression strength of less than 1.5 lbs. under comparable testing procedures.

Tangent modulus testing, which provides an indication of the strength of the external skin as determined in pounds per thousandth of an inch displacement, found 90 percent of the balls produced by procedure of example 2 to have a tangent modulus of greater than 0.6 lb./mil whereas 80 percent of these samples of example 2 were found to have a tangent modulus of at least 0.7 lb./mil. Comparatively, the samples prepared by example 1 were found to have a tangent modulus of less than 0.4 lb./mil while 90 percent of the example 1 samples were found to have a tangent modulus of less than 0.33 lb./mil.

The average maximum force required for rupture of samples under pressure, for malted-milk balls produced by the procedure of example 2 was found to be about 26.4 lb. as compared to an average of about 28.4 lb. for samples prepared by the procedure of example 1.

The procedure of example 2 results in redistribution of matter with a relatively greater density near the surface of the samples and a relatively lesser density at the interior foam. By having lesser density in the interior of the samples and hence less strength, there results an overall improvement in bite characteristic by providing a case hardened surface which may collapse onto a relatively weak central portion. Comparatively, the samples prepared by the procedure of example 1 are found to have substantially uniform density throughout.

Abrasion tests conducted on the samples of example 1 and example 2 were performed by placing a weighed amount of balls onto 20 and 30 mesh sieves. The sieves were then attached on end-to-end shakers and shaken for 5 minutes. The abrasion tests found under comparable testing procedures a weight reduction of 4.4 percent for the samples prepared by the procedure of example 2 as compared to an abrasive loss of 11.3 percent by weight for the samples prepared by the procedure of example 1. The greater abrasion resistance of samples prepared by the procedure of example 2 indicates an advantage of the case hardened surface which is absent in the product of example 1.

Samples of example 1 and example 2 were tested for size distribution for uniformity of expansion. Size distribution is important in preparation of malted-milk balls because coating operations require substantially uniform size so that larger surfaced balls may not be coated at the expense of smaller surfaced balls. Size tests performed in sample prepared by the procedure of example 2 found that 92 percent fell between 0.711 and 0.750 inch, a variation range of 0.04 inch. Size tests performed in the sample prepared by the procedure of example 1 found 84 percent between 0.781 to 0.840 inch, a variation range of 0.06 inch.

It is understood that the foregoing detailed description is given merely by way of illustration and that many variations may be made therein without departing from the spirit of the invention.

What is claimed is:
1. A method for preparing an aerated confectionary product which comprises:
  A. heating hard malted-milk taffy confectionary balls to a uniform softening point without substantial deformation at a temperature of about 70° C. to about 120° C.;
  B. cooling the softened malted-milk taffy confectionary balls to a temperature in the range of about 40° C. to about 70° C. to case harden the surfaces to a depth of about 1 percent to about 10 percent of the radial distance; and
  C. vacuum expanding said cooled malted-milk taffy confectionary balls having hardened surfaces and softened centers.

2. The method of claim 1 wherein case hardening is effected at a temperature of about 60° C.

3. The method of claim 1 wherein the hard malted-milk taffy confectionary balls heated in step A have an initial moisture content in the range of about 4 percent to about 6 percent by weight.

4. The method of claim 1 wherein vacuum expansion is effected under a vacuum of about 15 to about 30 mm. of mercury.

* * * * *